(No Model.)
M. J. HATCHER.
RUNNING GEAR FOR WAGONS.
No. 371,061. Patented Oct. 4, 1887.
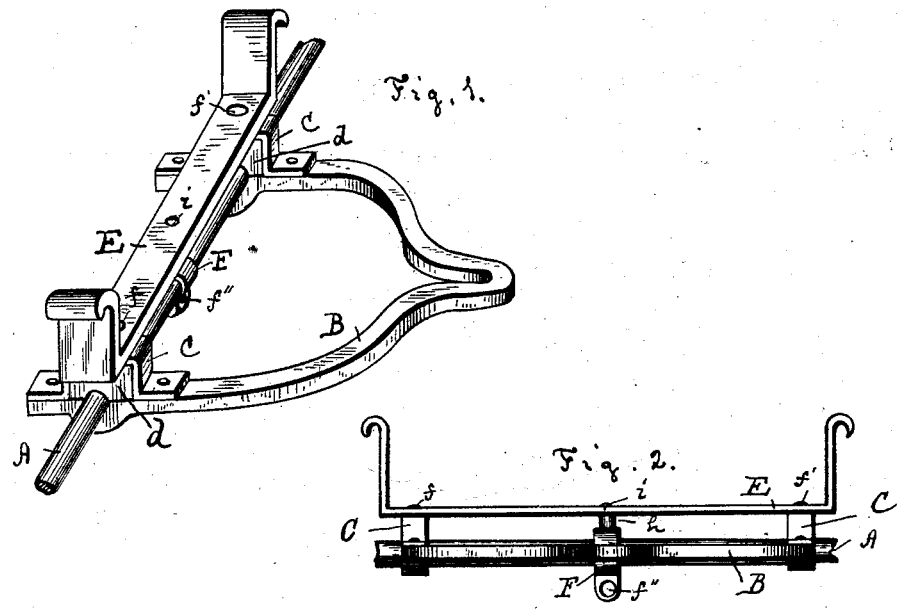
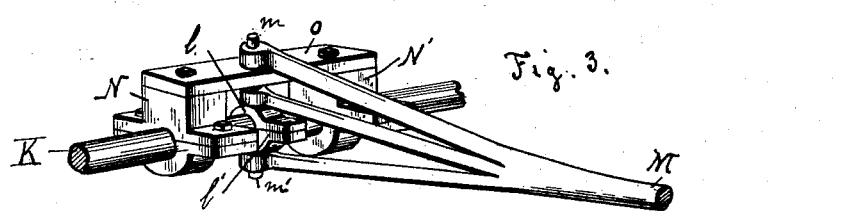
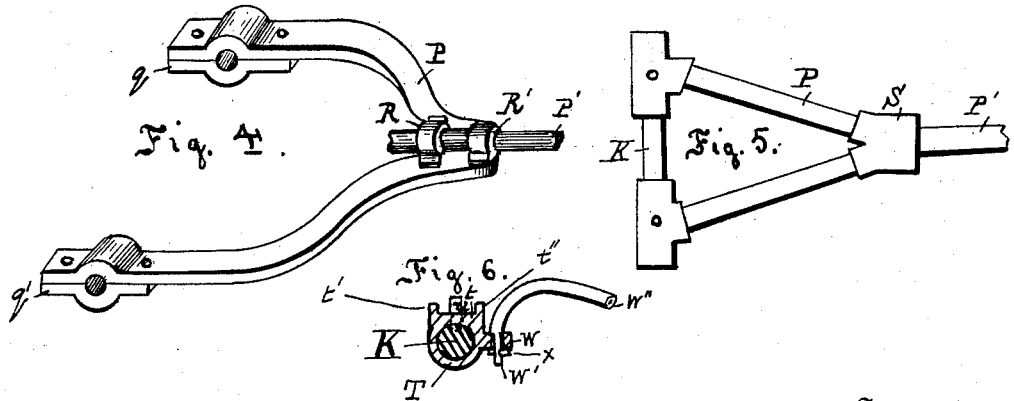
Witnesses
F. L. Ouraud
W. A. Smith
Inventor
M. J. Hatcher
By his Attorney
H. N. Jenkins

UNITED STATES PATENT OFFICE.

MARSHALL J. HATCHER, OF MACON, GEORGIA.

RUNNING-GEAR FOR WAGONS.

SPECIFICATION forming part of Letters Patent No. 371,061, dated October 4, 1887.

Application filed May 3, 1887. Serial No. 236,988. (No model.)

*To all whom it may concern:*

Be it known that I, MARSHALL J. HATCHER, a citizen of the United States, and a resident of Macon, county of Bibb, State of Georgia, have invented new and useful Improvements in Wagons and other Vehicles, of which the following is a full and exact description, reference being had to the accompanying drawings, making part of this specification.

My invention relates to certain new and useful improvements in the manufacture of wagons, &c., and especially refers to such parts of a wagon as are usually connected, directly or indirectly, with the axles thereof.

The object of my invention is to utilize metal in lieu of wood, and thereby lessen the cost of manufacture, and at the same time secure increased strength and durability of the various parts, with less weight and better appearance than heretofore attained.

My improvements consist, first, in the combination, with an axle, of hounds made of one or more pieces of metal, so that the rear ends of same shall encircle the axle and be secured thereto, either by pins, screws, or keys, or by forming the said ends in half-sections and securing the said sections together by means of rivets, as hereinafter described.

My invention further consists in the combination, with an axle, of an iron hound having its forward end provided with a pole-socket and a pole adapted to fit and be secured therein, as hereinafter more fully set forth.

My invention further consists in the combination, with the axle and hounds of a vehicle, of a metal bolster adapted to be secured to the hounds by means of rivets, as hereinafter more fully set forth.

My invention further consists in the combination, with an axle, of a plate or fifth-wheel and means for connecting same with the axle, as hereinafter more fully set forth.

My invention also consists in certain combinations and arrangements of parts, all of which are hereinafter fully set forth.

In the accompanying drawings, Figure 1 is a perspective view of the rear axle of a vehicle with a hound, bolster, and a support for the center of the bolster as well as the rear end of the reach-pole. Fig. 2 is a vertical longitudinal front view of the aforesaid parts. Fig. 3 is a perspective view of the front axle with forward part of the reach-pole and fifth-wheel connected therewith. Fig. 4 is a perspective view from the under side of the forward hounds. Fig. 5 is a modification of the latter figure, and Fig. 6 a sectional view of the front axle with a single shaft and coupling connected therewith.

The letter A designates the rear axle, and B a hound connected therewith. The hound in this figure is made of a single piece of flat or "bar" iron, bent at its center to produce the necessary forked or bifurcated figure. The ends of this bar are formed into half-boxes to fit one half of the axle, so as to be secured to the under side of same by means of clamps or covers C and intermediate blocks, *d*. The covers C are made with flat tops to afford rests for the outer ends of the bolsters E, which are secured thereto by means of rivets, as shown at *f f'*.

The letter F designates a sleeve having a hole, *f''*, in the lower projecting portion thereof for the reception of the rear end of the reach-pole, and an upwardly-projecting lug or pin, *h*, having a shoulder, on which the central part of the bolster rests, and is secured by riveting the same, as shown at *i*.

The forward axle is designated by the letter K, and is provided with a pair of clamps, *l l'*, (see Fig. 3,) the central portions of which are provided with projecting pins *m m'*, on which the forked ends of the front portion of the reach-pole M is adapted to fit, as is clearly shown in the drawings at Fig. 3, and hereinafter more fully described. At each side of the clamps *l l'* are secured a second set of clamps, N N', the upper sections of which are provided with flat surfaces, to which is securely riveted a plate or fifth-wheel, O. In the center of the plate O is a vertical hole for the passage of the upwardly-projecting pin *m* of the clamp *l*.

The letter P designates the front hounds, the rear ends of which are formed with openings therein to permit of their being slipped on the axle. Each of the aforesaid ends may consist of a single piece; or the said ends may be bent or curved to form half-boxes, the other half, *q q'*, of each box being made separate and connected with their respective ends by means of rivets, as shown in Fig. 4.

The forward part of the hounds P is provided with a socket for the reception of the rear end of the draft-pole P', the said socket being formed by connecting-straps, as shown at R R', with the front part of the hounds, or, if the said hounds be made of pipes or tubes, with a suitable coupling, as shown at S.

The letter T designates one of a pair of sleeves or couplings adapted to fit the forward axle, K, and having flat upper surfaces, t, provided with raised edges t' t'', between which the forward bolster is adapted to fit and be secured by a pin or rivet, u, which, if desired, can be made to penetrate the axle, and thus serve to hold all the parts firmly thereto. The front of each sleeve T is provided with an eye, w, for the reception of a pin, w', at the rear end of each shaft w''. The lower end of the pin w' is provided with a hole or slot for the reception of a key, x, whereby it is prevented from becoming detached from the sleeve-eye.

Having described my invention, what I claim as new, and desire to secure by Letters Patent, is—

1. In combination with an axle, a metal hound having its rear ends adapted to encircle the axle, the said encircling ends formed in a single piece or in sections and secured to the axle, substantially as and for the purpose set forth.

2. In combination with an axle, an iron hound having its rear ends adapted to encircle the axle, as described, and its front end provided with a pole-socket, substantially as and for the purpose set forth.

3. In combination with an axle and a metal hound having rear ends adapted to encircle said axle, a metal bolster adapted to rest on the upper surface of the encircling ends of the hounds and be secured thereto, substantially as and for the purpose specified.

4. The combination of an axle and a sleeve adapted to fit thereon, the said sleeve provided with upper and lower projections for supporting the reach-pole and the center of the bolster, substantially as set forth.

5. The combination of an axle and a pair of clamps, each having its raised portion provided with a projecting pin, as described, a fifth-wheel plate having a vertical central hole for the reception of one of the aforesaid pins, a pair of clamps for securing the fifth-wheel plate to the axle, and a reach-pole having its forward end provided with three branches, each having a perforation therein for the reception of the aforesaid clamp-pins, substantially as set forth.

6. The combination, with an axle and a pair of clamps having pins projecting outwardly from the centers of the raised portions thereof, of a fifth-wheel composed of a plate having a vertical hole in its center for the reception of one of the aforesaid pins, and the clamps whereby the ends of the plate are connected with the axle, substantially as set forth.

7. In combination with an axle, a pair of sleeves, T, having flat upper surfaces provided with raised side projections and forwardly-projecting eyes, the shafts w'', provided with reduced ends or pins w', and the key x for holding the same in position, substantially as and for the purpose specified.

In testimony whereof I affix my signature in presence of two witnesses.

M. J. HATCHER.

Witnesses:
 S. M. JENKINS,
 ALEX. MAHON.